United States Patent
Lee et al.

(10) Patent No.: US 10,856,176 B2
(45) Date of Patent: Dec. 1, 2020

(54) METHOD AND DEVICE FOR TRANSMITTING SIDELINK CHANNEL BUSY RATIO IN WIRELESS COMMUNICATION SYSTEM

(71) Applicant: LG Electronics Inc., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,460

(22) PCT Filed: Nov. 2, 2017

(86) PCT No.: PCT/KR2017/012314
§ 371 (c)(1),
(2) Date: May 3, 2019

(87) PCT Pub. No.: WO2018/084590
PCT Pub. Date: May 11, 2018

(65) Prior Publication Data

US 2019/0261216 A1    Aug. 22, 2019

Related U.S. Application Data

(60) Provisional application No. 62/471,375, filed on Mar. 15, 2017, provisional application No. 62/417,293, filed on Nov. 3, 2016.

(30) Foreign Application Priority Data

Oct. 11, 2017    (KR) .................. 10-2017-0129973

(51) Int. Cl.
*H04W 28/02* (2009.01)
*H04W 4/40* (2018.01)
(Continued)

(52) U.S. Cl.
CPC ......... *H04W 28/0289* (2013.01); *H04L 47/11* (2013.01); *H04W 4/40* (2018.02);
(Continued)

(58) Field of Classification Search
CPC .. H04B 17/318; H04L 47/11; H04W 28/0289; H04W 4/40; H04W 72/0406; H04W 74/002
See application file for complete search history.

(56) References Cited

U.S. PATENT DOCUMENTS

2015/0156662 A1*   6/2015   Bai .................. H04W 4/44
                                                   370/231
2018/0020387 A1*   1/2018   Van Der Velde ..........................
                                                   H04W 36/0072
(Continued)

FOREIGN PATENT DOCUMENTS

WO    2016/163251    10/2016

OTHER PUBLICATIONS

Nokia et al., R1-1609788, On congestion control for V2V communication, 3GPP TSG RAN WG1 #86bis, 3GPP(Oct. 1, 2016) See Section 2.1 (Year: 2016).*
(Continued)

*Primary Examiner* — Kashif Siddiqui
(74) *Attorney, Agent, or Firm* — Fish & Richardson P.C.

(57) ABSTRACT

As a channel busy ratio (CBR) is defined to measure the congestion of a PC5 interface in order to support an effective vehicle-to-everything (V2X) communication, an eNodeB (eNB) transmits CBR information of a sidelink channel to a user equipment (UE) for each resource pool used for V2X communication. The user equipment which has received the CBR information determines if there is a usable CBR and, if it is determined that there is no usable CBR, can use the received CBR information.

14 Claims, 6 Drawing Sheets

(51) Int. Cl.
*H04L 12/801* (2013.01)
*H04W 72/04* (2009.01)
*H04W 74/00* (2009.01)
*H04B 17/318* (2015.01)

(52) U.S. Cl.
CPC ..... *H04W 72/0406* (2013.01); *H04W 74/002* (2013.01); *H04B 17/318* (2015.01)

(56) References Cited

U.S. PATENT DOCUMENTS

| | | | |
|---|---|---|---|
| 2018/0042023 A1* | 2/2018 | Sheng | H04W 48/12 |
| 2018/0048572 A1* | 2/2018 | Gulati | H04L 43/12 |
| 2018/0124771 A1* | 5/2018 | Mok | H04W 36/32 |
| 2019/0132832 A1* | 5/2019 | Uchiyama | H04W 4/40 |

OTHER PUBLICATIONS

LG Electronics, R1-1609187, Discussion on congestion control for PC5-based V2X, 3GPP TSG RAN WG1 #86bis, GPP( Oct. 1, 2016) See Section 2.1, 2.3 (Year: 2016).*

Huawei et al., R2-166296, Congestion Control for PC5-based V2X, 3GPP TSG RAN WG2 #95bis, 3GPP(Oct. 1, 2016) See Section 2 (Year: 2016).*

LG Electronics, "Discussion on congestion control for PC5-based V2X," R1-1609187, 3GPP TSG RAN WG1 Meeting #86bis, Lisbon, Portugal, Oct. 10-14, 2016, 5 pages.

Panasonic, "Discussion on channel busy ratio measurement in V2X," R1-1609571, 3GPP TSG RAN WG1 Meeting #86bis, Lisbon, Portugal, Oct. 10-14, 2016, 5 pages.

Nokia, Alcatel-Lucent Shanghai Bell, "On congestion control for V2V communication," R1-1609788, 3GPP TSG RAN WG1 Meeting #86bis, Lisbon, Portugal, Oct. 10-14, 2016, 4 pages.

Huawei, HiSilicon, "Congestion Control for PC5-based V2X," R2-166296, 3GPP TSG-RAN WG2 Meeting #95-bis, Kaohsiung, Oct. 10-14, 2016, 5 pages.

Extended European Search Report in European Application No. 17868250.6, dated Jul. 8, 2019, 9 pages.

RAN WG1, "LS on RAN1 agreements potentially related to RAN2/4 in L TE-based V2X services," R4-1609028, 3GPP TSG RAN WG4 Meeting #81, Reno, Nevada, USA, Nov. 14-18, 2016, 3 pages.

LG Electronics Inc., "Support for V2P service," R2-167032, 3GPP TSG-RAN WG2 #95bis, Kaohsiung, Taiwan, Aug. 22-26, 2016, 2 pages.

Ericsson, "Congestion Control in V2V," R2-165516, 3GPP TSG-RAN WG2 #95, Gothenburg, Sweden, Aug. 22-26, 2016, 4 pages.

LG Electronics Inc., "Channel busy ratio reporting," R2-168765, 3GPP TSG-RAN2 Meeting #96, Reno, U.S.A., Nov. 14-18, 2016, 3 pages.

Nokia, Alcatel-Lucent Shanghai Bell, "On resource selection for V2P communication," R1-1609787, 3GPP TSG RAN WG1 Meeting #86bis, Lisbon, Portugal, Oct. 10-14, 2016, 4 pages.

* cited by examiner

METHOD AND DEVICE FOR TRANSMITTING SIDELINK CHANNEL BUSY RATIO IN WIRELESS COMMUNICATION SYSTEM

CROSS-REFERENCE TO RELATED APPLICATIONS

This application is a National Stage application under 35 U.S.C. § 371 of International Application No. PCT/KR2017/012314, filed on Nov. 2, 2017, which claims the benefit of Korean Application No. 10-2017-0129973, filed on Oct. 11, 2017, U.S. Provisional Application No. 62/471,375, filed on Mar. 15, 2017, and U.S. Provisional Application No. 62/417,293, filed on Nov. 3, 2016. The disclosures of the prior applications are incorporated by reference in their entirety.

BACKGROUND OF THE INVENTION

Field of the Invention

The present invention relates to wireless communication, and more particularly, to a method and device for transmitting a sidelink channel busy ratio (CBR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

To support effective V2X communication, the channel busy ratio (CBR) can be defined for congestion measurements on the PC5 interface. Various aspects associated with CBR are being discussed.

SUMMARY OF THE INVENTION

The present invention provides a method and device for transmitting a sidelink channel busy ratio (CBR) in a wireless communication system. The present invention provides a method for a network to broadcast the CBR information to all UEs in a cell. The present invention provides a method of using, by UE, CBR information broadcast from a network when a CBR is not available.

In an aspect, a method for transmitting channel busy ratio (CBR) information by an eNodeB (eNB) in a wireless communication system is provided. The method includes transmitting the CBR information of a sidelink channel to a user equipment (UE) per each resource pool used for a vehicle-to-everything (V2X) communication.

In another aspect, a method for using channel busy ratio (CBR) information by a user equipment (UE) in a wireless communication system is provided. The method includes receiving the CBR information of a sidelink channel from an eNodeB (eNB) per each resource pool used for a vehicle-to-everything (V2X) communication, determining whether there is available CBR, and upon determination that there is no available CBR, using the received CBR information.

In another aspect, a user equipment (UE) in a wireless communication system is provided. The UE includes a memory, a transceiver, and a processor, operably coupled to the memory and transceiver, and configured to control the transceiver to receive channel busy ratio (CBR) information of a sidelink channel from an eNodeB (eNB) per each resource pool used for a vehicle-to-everything (V2X) communication, determine whether there is available CBR, and upon determination that there is no available CBR, use the received CBR information.

In accordance with present invention allowing all UEs in the cell to use CBR information, the V2X transmission pattern/parameters can be effectively adjusted.

DESCRIPTION OF EXEMPLARY EMBODIMENTS

Figure 1:
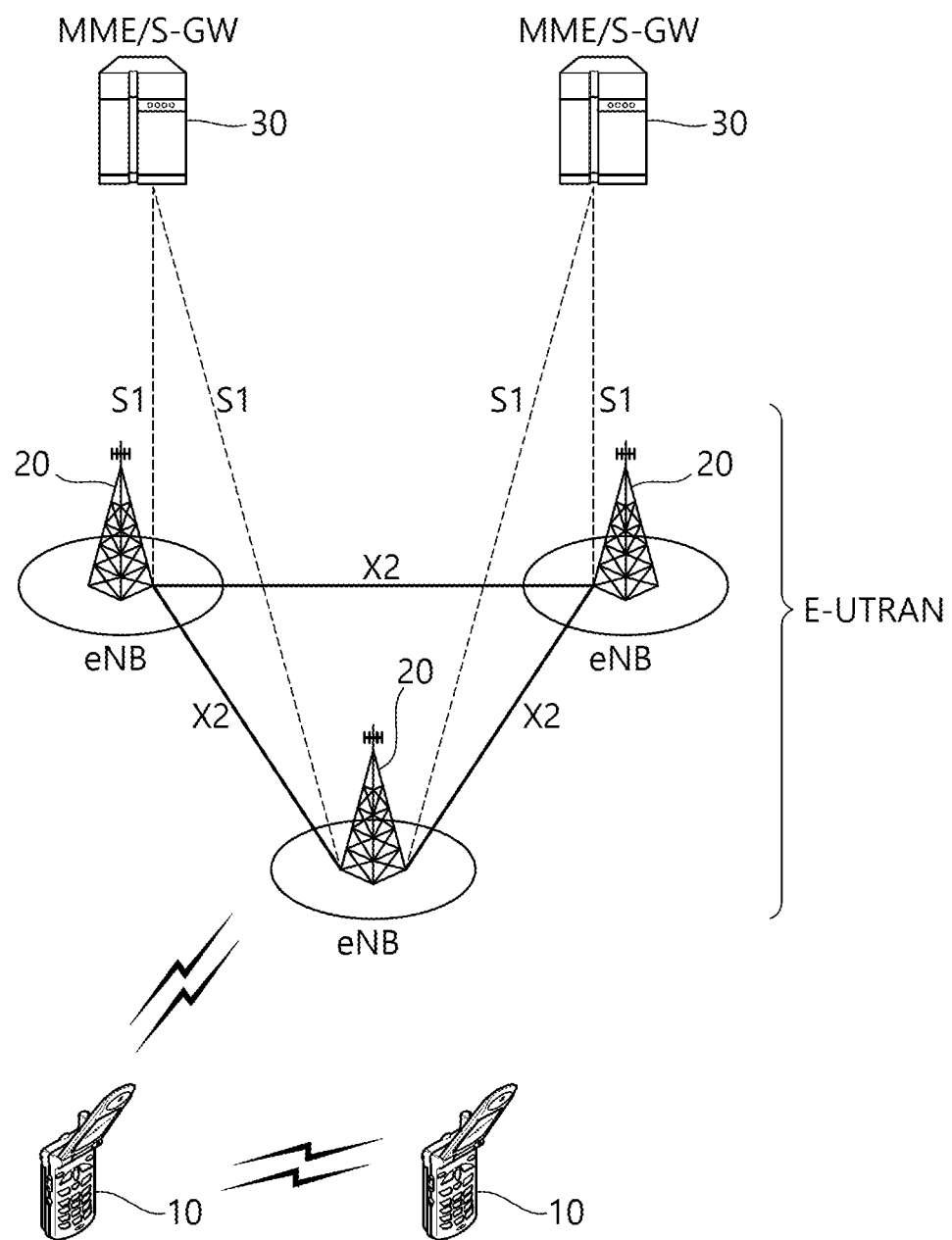
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
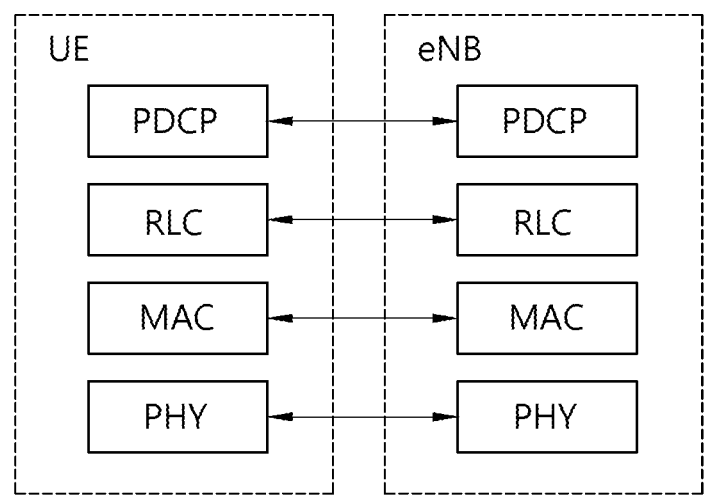
FIG. 2 shows a block diagram of a user plane protocol stack of an LTE system.
Figure 3:
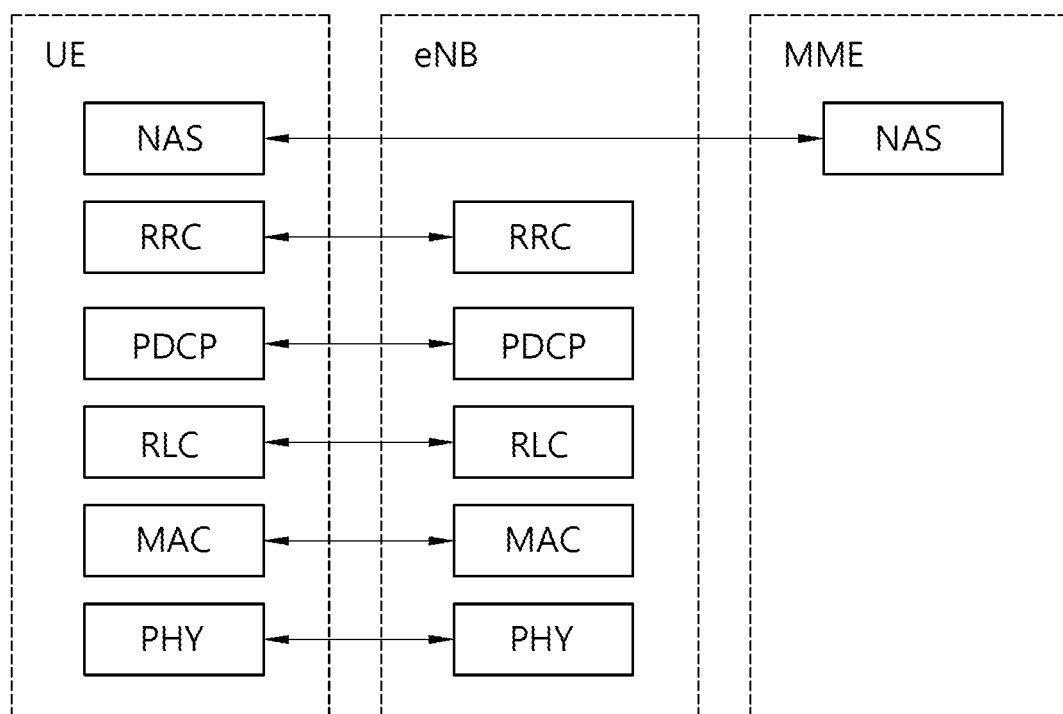
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The sidelink physical channels are mapped to sidelink transport channels. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channels include a sidelink broadcast control channel (SBCCH) which is a sidelink channel for broadcasting sidelink system information from one UE to other UE(s). The SBCCH is mapped to the SL-BCH. The sidelink traffic channels include a sidelink traffic channel (STCH) which is a point-to-multipoint channel, for transfer of user information from one UE to other UE(s). The STCH is mapped to the SL-SCH. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

The UE supporting sidelink communication can operate in the following two modes for resource allocation. The first mode is a scheduled resource allocation. The scheduled resource allocation may be called Mode 1. In mode 1, the UE needs to be RRC_CONNECTED in order to transmit data. The UE requests transmission resources from the eNB. The eNB schedules transmission resources for transmission of sidelink control information (SCI) and data. The UE sends a scheduling request (dedicated scheduling request (D-SR) or random access) to the eNB followed by a sidelink buffer status report (BSR). Based on the Sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource allocation. The UE autonomous resource allocation may be called Mode 2. In mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more Prose per-packet priority (PPPP) associated with it. For transmission of a MAC protocol data unit (PDU), the UE selects a transmission pool in which one of the associated PPPP is equal to the PPPP of a logical channel with highest PPPP among the logical channel identified in the MAC PDU. There is a one to one association between sidelink control pool and sidelink data pool. Once the resource pool is selected, the selection is valid for the entire sidelink control period. After the sidelink control period is finished, the UE may perform resource pool selection again.

A UE is considered in-coverage for sidelink communication whenever it detects a cell on a public safety ProSe carrier. If the UE is out of coverage for sidelink communication, it can only use Mode 2. If the UE is in coverage for sidelink communication, it may use Mode 1 or Mode 2 as per eNB configuration. If the UE is in coverage for sidelink communication, it shall use only the resource allocation mode indicated by eNB configuration unless one of the exceptional cases occurs. When an exceptional case occurs, the UE is allowed to use Mode 2 temporarily even though it was configured to use Mode 1. Resource pool to be used during exceptional case may be provided by eNB.

The cell on the public safety ProSe carrier may select one of the following two options. First, the cell on the public safety ProSe carrier may provide a transmission resource pool for Mode 2 in SIB18. UEs that are authorized for sidelink communication may use these resources for sidelink communication in RRC_IDLE in the cell on the same carrier (i.e. public safety ProSe carrier). UEs that are authorized for sidelink communication may use these resources for sidelink communication in RRC_IDLE or RRC_CONNECTED in a cell on another carrier.

Alternatively, the cell on the public safety ProSe carrier may indicate in SIB18 that it supports sidelink communication but does not provide transmission resources. UEs need to enter RRC_CONNECTED to perform sidelink communication transmission. In this case the cell on the public safety ProSe carrier may provide in broadcast signalling an exceptional transmission resource pool for Mode 2, to be used by the UE in exceptional cases. A UE in RRC_CONNECTED that is authorized to perform sidelink communication transmission indicates to the serving eNB that it wants to perform sidelink communication transmissions. The eNB validates whether the UE is authorized for sidelink communication transmission using the UE context received from MME. The eNB may configure a UE by dedicated signalling with a transmission resource pool for Mode 2 that may be used without constraints while the UE is in RRC_CONNECTED. Alternatively, the eNB may configure a UE to use the exceptional transmission resource pool for Mode 2 which the UE is allowed to use only in exceptional cases, and rely on Mode 1 otherwise.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of E-UTRA in that frequency. The pre-configured frequency is the same frequency as the public safety ProSe carrier.

There are two types of resource allocation for discovery message announcement. The first type is a UE autonomous resource selection, which is a resource allocation procedure where resources for announcing of discovery message are allocated on a non UE specific basis. The UE autonomous resource selection may be called Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second is a scheduled resource allocation, which is a resource allocation procedure where resources for announcing of discovery message are allocated on per UE specific basis. The scheduled resource allocation may be called Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide resource pools for Type 1 based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. A UE can also indicate to the eNB the frequency(s) in which sidelink discovery announcement is desired. The eNB validates whether the UE is authorized for sidelink discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or, the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring on intra frequency, inter frequency of same or different PLMNs cells in RRC signaling (SIB19). The RRC signaling (SIB19 or dedicated) may contain detailed sidelink discovery configuration used for announcement of sidelink discovery in cells of intra-frequency, inter-frequency of same or different PLMNs.

Vehicle-to-everything (V2X) communication is described. V2X communication contains the four different types, i.e. vehicle-to-vehicle (V2V) communications, vehicle-to-infrastructure (V2I) communications, vehicle-to-network (V2N) communications and vehicle-to-pedestrian (V2P) communications. These four types of V2X can use "cooperative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

In V2X communication, messages such as common awareness messages (CAM), decentralized environmental notification messages (DENM), or basic safety messages (BSM) may be transmitted. The CAM includes information on a vehicle's type, a location, speed, a direction, etc., and may be periodically broadcasted by any vehicle. The DENM includes information on a type of a particular event and an area where the particular event has occurred, and may be broadcasted by an RSU or a vehicle. The BSM is included in the U.S. J2735 basic safety message, and have similar characteristics to those of the CAM. Through the BSM, an emergency brake warning, a front collision warning, an intersection safety support, a blind spot and line departure warning, a overtake warning, an out-of-control warning service may be provided.

Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The user plane protocol stack and functions for sidelink communication are also used for V2X sidelink communication. In addition, for V2X sidelink communication, STCH for sidelink communication is also used for V2X sidelink communication. Also, non-V2X (e.g. public safety) data is not multiplexed with V2X data transmitted in resources configured for V2X sidelink communication. Control plane protocol stack for SBCCH for sidelink communication is also used for V2X sidelink communication.

The UE supporting V2X sidelink communication can operate in two modes for resource allocation. The first mode is a scheduled resource allocation. The scheduled resource allocation for V2X sidelink communication may be called Mode 3. The UE needs to be RRC_CONNECTED in order to transmit data. The UE requests transmission resources from the eNB. The eNB schedules transmission resources for transmission of sidelink control information and data. The second mode is a UE autonomous resource selection. The UE autonomous resource selection for V2X sidelink communication may be called Mode 4. The UE on its own selects resources from resource pools and performs transport format selection to transmit sidelink control information and data. If mapping between the zones and V2X sidelink transmission resource pools is configured, the UE selects V2X sidelink resource pool based on the zone UE is located in.

The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission. Geographical zones can be configured by the eNB or pre-configured. When zones are configured, the world is divided into geographical zones using a single fixed reference point (i.e. geographical coordinates (0, 0)), length and width. The UE determines the zone identity by means of modulo operation using length and width of each zone, number of zones in length, number of zones in width and the single fixed reference point. The length and width of each zone, number of zones in length and number of zones in width are provided by the eNB when the UE is in coverage and pre-configured when the UE is out of coverage. The zone is configurable for both in coverage and out of coverage. For in coverage UE, when the UE uses UE autonomous resource selection (i.e. Mode 4), the eNB can provide the mapping between zone(s) and V2X sidelink transmission resource pools in SIB21. For out of coverage UEs, the mapping between the zone(s) and V2X sidelink transmission resource pools can be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell can be signaled in the handover command to reduce the transmission interruption, so that the UE may use the transmission sidelink resource pools of the target cell before the handover is completed as long as synchronization is performed with the target cell. If the exceptional transmission resource pool is included in the handover command, the UE starts using randomly selected resources from the exceptional transmission resource pool starting from the reception of handover command. If the UE is configured with scheduled resource allocation (i.e. Mode 3) in the handover command, the UE continues to use the exceptional transmission resource pool while the timer associated with handover is running. If the UE is configured with autonomous resource selection (i.e. Mode 4) in the target cell the UE continues to use the exceptional transmission resource pool until the initial sensing is completed on the transmission resource pools for autonomous resource selection. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on sensing, and uses them temporarily. In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell. A UE is considered in-coverage on the carrier used for V2X sidelink communication whenever it detects a cell on that carrier. If the UE that is authorized for V2X sidelink communication is in-coverage for V2X sidelink communication it may use scheduled resource allocation (i.e. Mode 3) or UE autonomous resource selection (i.e. Mode 4) as per eNB configuration. A set of transmission and reception resource pools for data when the UE is out of coverage for V2X sidelink communication is pre-configured in the UE. V2X sidelink communication resources are not shared with other non-V2X applications transmitted over sidelink.

An RRC_CONNECTED UE may send a sidelink UE Information message to the serving cell if it is interested in V2X communication transmission in order to request sidelink resources. If the UE is configured by higher layers to receive V2X communication and PC5 resources are provided, the UE receives on those configured resources.

The serving cell can provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and global navigation satellite system (GNSS). In case GNSS is configured as synchronization source, the UE utilizes the coordinated universal time (UTC) time to calculate direct frame number and subframe number. In case eNB timing is configured as synchronization reference to the UE for dedicated carrier for V2X, the UE follows PCell (RRC_CONNECTED)/serving cell (RRC_IDLE) for synchronization and DL measurements.

To support effective V2X sidelink communication, sidelink channel busy ratio (CBR) can be defined for congestion measurements on PC5. CBR may be defined as a ratio of a portion of sub-channels over which a sidelink received signal strength indicator (S-RSSI) observed over a specified time duration (e.g. 100 ms) exceeds a (pre)configured threshold value. Only the sub-channels included in the resource pool may be used for CBR measurements. For a UE in a mode 3, the eNB may indicate the set of resources for which the UE will perform CBR measurements. In case of the UE of a mode 4, the CBR measurement can be performed in a resource pool specific manner. The UE may perform CBR measurements on at least the current transmission resource pool, i.e., the transmission resource pool used to perform the current V2X sidelink communication. Whether the UE will perform CBR measurements on the transmission resource pools rather than the current transmission resource pool is under discussion. Further, the UE may report the result of the CBR measurement to the eNB.

Hereinafter, various operations of a UE or a network related to CBR are proposed according to various embodiments of the present invention.

1. Broadcast CBR Information

There may be a situation where the UE cannot use the CBR information about the current transmission resource pool as follows.

1) When the UE performs CBR measurement only for the current transmission resource pool and when the transmission resource pool is changed as the UE moves 2) When the UE changes the serving cell and when the UE does not perform the CBR measurement before changing the serving cell 3) In case of pedestrian UE (P-UE) without sensing capability When the UE cannot use the CBR information for the current transmission resource pool, the transmission pattern and/or parameters for V2X communication may not be adjusted. As a result, UE with available CBR information may not be preferred over UE with low priority traffic and no available CBR information. Therefore, in order to fairly apply the transmission pattern/parameter adjustment for V2X communication to between all UEs, it is necessary that all UEs in the cell have CBR information available.

Figure 4:
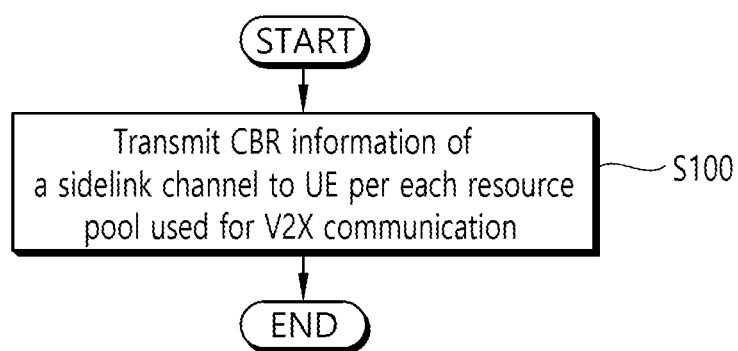
FIG. 4 shows a method by which an eNB transmits CBR information according to one embodiment of the present invention.

FIG. 4 shows a method by which an eNB transmits CBR information according to one embodiment of the present invention. In step S100, the eNB broadcasts the CBR information of the sidelink channel to UEs in the cell per each resource pool used for V2X communication. The CBR information may include a CBR value, expressed as a percentage between 0 and 100. The CBR value may have a value between 0 and 100 in an x unit. For example, when x=10, then the CBR value may be any value between {0, 10, 20 . . . 100}. Further, the CBR information may include associated resource pool ID information.

The CBR information may be broadcast via a system information block type (SIB) 21 for V2X sidelink communication. Alternatively, when the update frequency of the CBR information is different from that of existing information included in the SIB 21, the CBR information may be broadcast via a new SIB.

Figure 5:
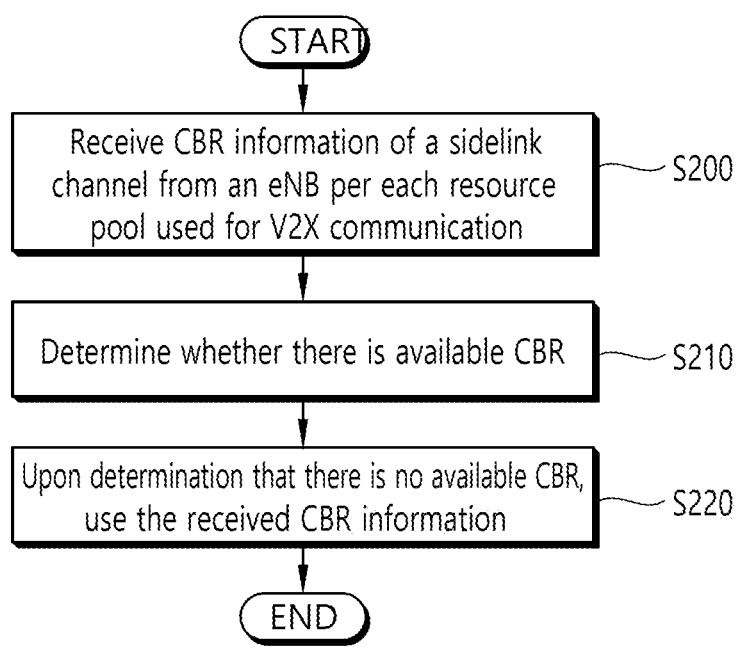
FIG. 5 shows a method by which a UE uses CBR information according to one embodiment of the present invention.

FIG. 5 shows a method by which a UE uses CBR information according to one embodiment of the present invention. In step S200, the UE receives the CBR information of the sidelink channel from the eNB per each resource pool used for V2X communication. In step S210, the UE determines whether there is an available CBR. If it is determined that there is no available CBR, in step S220, the UE uses the received CBR information. If it is determined that there is an available CBR, the UE may ignore the received CBR information.

The CBR information may include a CBR value, expressed as a percentage between 0 and 100. The CBR value may have a value between 0 and 100 in an x unit. For example, when x=10, then the CBR value may be any value between {0, 10, 20 . . . 100}. Further, the CBR information may include associated resource pool ID information. Further, the CBR information may be received via a SIB 21 for V2X sidelink communication.

Alternatively, when the update frequency of the CBR information is different from that of existing information included in the SIB 21, the CBR information may be received via a new SIB.

2. CBR Reporting Configuration and Reporting (1) Step 1: The network configures the CBR reporting configuration. The CBR reporting configuration may include information about a measurement object. The information about the measurement object may be a resource pool ID including an exceptional resource pool.

The CBR reporting configuration may be configured per UE, per resource pool, or per priority order specific manner. The CBR report may be triggered and reported by an event, or reported periodically. The trigger type of the CBR report may be configured per resource pool or per priority specific manner.

When the CBR report is triggered by an event, the following event may be defined:

Event 1: when a CBR of current resource pool is equal to or greater than (provided CBR level+offset).

Event 2: when a CBR of current resource pool is equal to or greater than (provided CBR level−offset).

Event 3: when a CBR of the current resource pool is higher or lower than a last reported CBR value for the corresponding resource pool by an offset.

The CBR level may be provided via dedicated signaling or broadcast signaling. The provided CBR level may be the CBR level of the current resource pool. When the CBR level is not provided via dedicated signaling, the UE may use the CBR information provided via broadcast signaling. The offset may be provided via dedicated signaling or broadcast signaling. Further, the CBR level may be provided via broadcast signaling, and the offset may be configured via dedicated signaling.

Further, when the CBR report is triggered by an event, the CBR report configuration may include information on a time to trigger (TTT). This indicates the time duration for which a specific criterion for an event that triggers a CBR report should be met. The TTI may be configured per each UE, per resource pool, or per priority.

When the CBR report is reported periodically, a periodic report timer may be configured per UE, per resource pool or per priority. When the timer value is configured per each resource pool or per priority, different timers may be executed between different resource pools or different priorities.

In the above description, the priority may be ProSe per-packet-priority (PPPP).

(2) Step 2: The UE performs the CBR measurement on the measurement object configured using the related parameter (for example, TTT). The UE triggers a measurement report when an event about the resource pool or priority is met or the periodic timer expires.

3. CBR-Based Path Switching

When the sidelink channel busy ratio is high, it may not be possible to adjust the transmission pattern. In this case, it may be desirable to switch the traffic transmission from the sidelink (i.e. PC5 interface) to the uplink (Uu interface). For a UE in RRC_CONNECTED, the network may control the path of the UE based on the reported CBR information. When the network determines that there is a high degree of overload in the sidelink, the network may release a dedicated sidelink resource configured to allow the UE to transmit traffic on the uplink.

On the other hand, for RRC_IDLE UE, there must be clear criteria to switch the path between the sidelink and uplink. Otherwise, the UE will not impose a penalty on itself to mitigate the busy ratio. The UE will not change the transmission pattern and thus the busy ratio may not be improved. To avoid this phenomenon, it is necessary for the network to provide an explicit criteria for the UE in RRC_IDLE to switch the path from the sidelink to the uplink.

A concrete method for performing the CBR-based path switching is as follows. In this connection, it is assumed that the UE is currently using the sidelink.

(1) Step 1: The UE performs CBR measurement on the current transmission resource pool and/or the resource pool provided via the broadcast/dedicated signaling. The UE may start performing the CBR measurement after receiving the resource pool information to be measured in Step (2) as described later.

(2) Step 2: The network provides CBR level information via broadcast/dedicated signaling. The CBR level information includes at least one of the following information:

CBR value where the UE is allowed to switch to the uplink path

Interface (sidelink, uplink or both) allowed for transmission/reception and CBR range information A resource pool ID (pool identity) associated with the CBR value or the CBR range information.

When the resource pool information is provided and the UE uses the resource pool, the UE may apply the relevant CBR value or CBR range to the resource pool.

(3) Step 3: When the CBR measurement result from the UE is equal to or greater than the CBR value, the UE triggers establishment of the RRC connection. Specifically, the AS layer of the UE may inform a higher layer (e.g., the NAS layer) of the necessity of switching to the uplink path. The NAS layer of the UE may trigger establishment of an RRC connection. When the CBR of the current transmission resource pool is within a single CBR range, the AS layer of the UE may notify the higher layer of the allowed interface and the higher layer may determine the path. As a result, the path may be switched to the uplink for transmission/reception.

Figure 6:
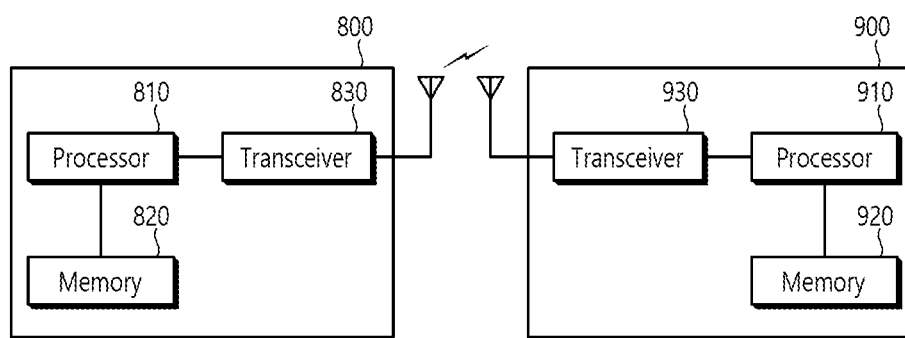
FIG. 6 shows a wireless communication system to implement an embodiment of the present invention.

FIG. 6 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method by a wireless device in a wireless communication system, the method comprising:
   receiving, from a network, channel busy ratio (CBR) information for a resource pool; and
   performing a sidelink communication based on transmission parameters,
   wherein, based on a CBR measured for the resource pool being available, the transmission parameters are determined based on the measured CBR, and
   wherein, based on the CBR measured for the resource pool being unavailable, the transmission parameters are identified by the CBR information received from the network.

2. The method of claim 1, wherein the CBR information is ignored in determining the transmission parameters based on the CBR measured for the resource pool being available.

3. The method of claim 1, wherein the CBR information includes a CBR value expressed as a percentage between 0 and 100.

4. The method of claim 3, wherein the CBR value is a ratio of a portion of a sub-channel over which a sidelink received signal strength indicator (S-RSSI) exceeds a threshold value during a specific time duration.

5. The method of claim 1, wherein the CBR information includes information on an identity (ID) of the resource pool.

6. The method of claim 1, wherein the CBR information is received via a system information block type (SIB)-21 for a vehicle-to-everything (V2X) communication.

7. A wireless device in a wireless communication system, the wireless device comprising:
   a memory;
   a transceiver; and
   at least one processor, operably coupled to the memory and transceiver, configured to:
   control the transceiver to receive, from a network, channel busy ratio (CBR) information for a resource pool, and
   perform a sidelink communication based on transmission parameters,
   wherein, based on a CBR measured for the resource pool being available, the transmission parameters are determined based on the measured CBR, and
   wherein based on the CBR measured for the resource pool being unavailable, the transmission parameters are identified by the CBR information received from the network.

8. The method of claim 6, wherein the wireless device is in communication with at least one of a user equipment, a network, or autonomous vehicles other than the wireless device.

9. The wireless device of claim 7, wherein the wireless device is in communication with at least one of a user equipment, a network, or autonomous vehicles other than the wireless device.

10. The wireless device of claim 7, wherein the CBR information is ignored in determining the transmission parameters based on the CBR measured for the resource pool being available.

11. The wireless device of claim 7, wherein the CBR information includes a CBR value expressed as a percentage between 0 and 100.

12. The wireless device of claim 11, wherein the CBR value is a ratio of a portion of a sub-channel over which a sidelink received signal strength indicator (S-RSSI) exceeds a threshold value during a specific time duration.

13. The wireless device of claim 7, wherein the CBR information includes information on an identity (ID) of the resource pool.

14. The wireless device of claim 7, wherein the CBR information is received via a system information block type (SIB)-21 for a vehicle-to-everything (V2X) communication.

* * * * *